з,220,934
DISTILLAND TREATMENT TO ACCELERATE EVAPORATION AND CONDENSATE TREATMENT TO RETARD EVAPORATION
Nicky Beredjick, Chicago, Ill., assignor to Standard Oil Company, Chicago, Ill., a corporation of Indiana
No Drawing. Filed June 28, 1962, Ser. No. 205,867
20 Claims. (Cl. 202—56)

This invention relates to a novel method for carrying out evaporating and/or distilling operations. More particularly, it relates to a method of increasing the evaporation of water from aqueous liquid media, especially at temperatures below the boiling point of aqueous liquid media. It is especially useful in connection with the economical production of salt and fresh water from saline water by solar evaporation and will be illustratively described as employed for this purpose. Atmospheric or solar evaporation of aqueous liquid media is frequently utilized for the recovery of dissolved or suspended solids and/or for the recovery of water from such media. Saline waters are frequently used for the production of salt or fresh water by solar evaporation. In connection with the manufacture of salt from saline waters, sea water or other water having a high saline content is introduced into large evaporating ponds wherein the water is atmospherically evaporated, and the soluble salts present in such waters are subsequently recovered through crystallization. Solar stills can be used in the conversion of saline water to fresh water. In the disposition of industrial wastes, evaporating ponds are frequently used to remove water from such wastes. In operations utilizing evaporation techniques, the rate of vaporization of water is critical, for usually production is based upon the amount of water that is evaporated per unit time.

It has been discovered that when the surface of aqueous liquid media undergoing evaporation is covered with a film of an alkylphenoxypoly(alkyleneoxy) alkanol, the rate of evaporation of water from the aqueous liquid media is effectively increased at a given temperature over the rate of evaporation in the absence of said film.

Briefly, the method of this invention comprises covering the surface of aqueous liquid media undergoing evaporation with a film of an alkylphenoxypoly(alkyleneoxy) alkanol and thereby accelerating the rate of evaporation of water from said medium at a given temperature over the rate of evaporation in the absence of said layer.

The alkylphenoxypoly(alkyleneoxy) alkanols found to produce the unexpected result of accelerating the rate of evaporation of water from evaporating liquids are non-ionic surfactants and are commonly referred to as polyalkyleneoxy ethers of alkylphenols. These compounds are condensation products of alkylphenols and from 1 to 150 or more moles, preferably 1 to 30, of an alkylene oxide, preferably ethylene oxide. Such compounds have varying degrees of water solubility, depending on the amount of alkylene oxide used in their formation. For the purposes of this invention, the water solubility characteristics are not critical, for it has been found that those classified as being water-insoluble or completely water-soluble produce substantially the same results. The phenols can be substituted with one, two or three alkyl groups. The aromatic nucleus bearing the phenolic hydroxyl can be benzene, naphthylene or diphenyl.

The alkylphenoxypoly(alkyleneoxy) alkanols preferably used in the method of this invention are those represented by the formula

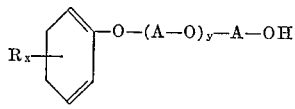

wherein R is an alkyl group having from about 8 to about 18 carbon atoms, $x$ is 1 to 3, A is a divalent alkylene group having the empirical formula $C_nH_{2n}$ wherein $n$ is 2 to 8 derived from the alkylene oxide, and $y$ is 1 to 150. These compounds are condensates of monoalkyl, dialkyl or trialkyl phenols and an alkylene oxide having 2 to 8 carbon atoms in its chain, such as ethylene oxide, propylene oxide, butylene oxide, hexylene oxide and octylene oxide. Exemplary of the alkyl phenols suitable for use in preparing the aforementioned alkanols are mono-, di-, and trioctyl phenol, mono-, di-, and trinonyl phenol, and tri-substituted decyl, tetradecyl, hexadecyl and octadecyl phenols. The nonylphenoxypoly(ethyleneoxy)$_n$ ethanols wherein $n$ is from about 1 to about 30, that is containing from about 1 to about 30 ethyleneoxy groups, are preferably used as the water evaporation accelerators in the present invention.

Coverage of the aqueous liquid medium undergoing evaporation can be effected by simply floating the alkylphenoxypoly(alkyleneoxy) alkanols on the surface thereof or by spraying. Since these compounds vary from liquids to solids, depending upon the number of alkyleneoxy-groups present in the molecule, the preferred method is to disolve these compounds in a water-miscible alcohol having from 1 to 4 carbon atoms and apply the resultant solution to the surface of the aqueous liquid medium undergoing evaporation. Such water-miscible alcohols are the lower fatty alcohols, methanol, ethanol, propanol, isopropanol and the isomeric butanols. It has been found that the use of the aforesaid water-miscible lower fatty alcohols facilitates the distribution of alkylphenoxypoly(alkyleneoxy) alkanols on the surface of the aqueous liquid medium, and together with alkylphenoxypoly(alkyleneoxy) alkanols accelerate the rate of water evaporation.

Evaporation of water from aqueous liquid media can be conducted over a broad range of temperatures and frequently is conducted at temperatures below the boiling point of such liquids; especially aqueous liquid media containing heat sensitive solids or solids that precipitate out at elevated temperatures. The present invention is extremely effective for accelerating the rate of evaporation of water below the boiling point of water, as for example, the evaporation of water at room temperatures or at slightly elevated temperatures such as are obtained under solar evaporation conditions. When desired, the temperature of the evaporating media may be elevated by introducing heat to the media through submerged coils or by passing hot gases therethrough. Aeration of the aqueous liquid media can be effected by bubbling an aeriform fluid such as air through the body of the liquid medium and this also assists in the evaporation of water therefrom, especially at ambient temperatures.

The following examples are illustrative of the increased rate of evaporation of water from aqueous liquid media that is obtained by practicing the invention.

The production of fresh water from saline water by means of solar evaporation is a simple and low-cost process. However, the effective utilization of solar stills for the production of fresh water from saline water by solar evaporation has been limited by the low rate of vaporization of water in the still. Inasmuch as solar stills are well known in the art, it is not necessary to describe them in detail. Briefly, the solar still is a distillation apparatus wherein water is vaporized and the vapor subsequently condensed either within or without the evaporating zone. Inasmuch as the rate of vaporization is dependent upon the amount of solar energy absorbed by the liquid undergoing evaporation in the still, various means have been suggested for increasing the rate of vaporization. For example, the depth of the body of water has been reduced; the bottom of the still has been constructed from black materials so as to increase the rate of adsorption of the solar energy and thereby introduce more heat into the evaporating liquid. While these techniques have been of some benefit, they have been inadequate to sufficiently increase the rate of vaporization. Another problem associated with the operation of solar stills is the re-evaporation of the condensed fresh water collected in the evaporating-condensing zone or in a condensing zone exterior to the evaporating-condensing zone.

A specific embodiment of the present invention is a method for the production of fresh water from saline water. The method comprises exposing a body of saline water having positioned on its surface a film of an alkylphenoxypoly(alkyleneoxy) alkanol to heat in an evaporating zone; collecting and condensing the water vapor so formed to obtain fresh water; and thereafter covering the surface of the condensed fresh water with a film of an ester of a long straight chain fatty alcohol having the general formula:

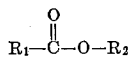

wherein $R_1$ is selected from the group consisting of hydrogen and an alkyl group having 1 to 2 carbon atoms, and $R_2$ is an alkyl group having from about 10 to about 36 carbon atoms, whereby evaporation of said condensed fresh water is retarded. This method is preferably conducted at atmospheric pressure with solar energy as the primary source of heat. Ancillary heat can be introduced into the process by means of warm water or other fluids or gases circulating through coils submerged in the body of saline water. A circulating aeriform fluid such as air may also be used in the vapor space above the evaporating surface to assist in removal of the water vapor adjacent thereto to a condensing zone exterior to the evaporating zone.

The ester of a long chain fatty alcohol such as cetyl acetate and its use as an evaporation retardant is fully described in co-pending application S.N. 849,218, filed October 28, 1959; the disclosure of which to the extent it describes those esters and their use is incorporated by reference. Re-evaporation of the condensed fresh water can be retarded by covering the condensed water with a film of the ester in any known manner. These esters are self-spreading so that the intermittent application of the ester to the surface of the condensed water will quickly produce a monomolecular film and thereby retard re-evaporation of the water. For example, cetyl acetate, which is a liquid at room temperature, can be applied to the surface from a dropping applicator. Other means will be readily apparent to one skilled in the art.

Another specific embodiment of the present invention is an improvement in the solar evaporation process for the production of salt from saline water, which improvement comprises covering the surface of saline water in an evaporating zone with a thin floating film of alkylphenoxypoly(alkyleneoxy) alkanol whereby the rate of vaporization of water is accelerated at evaporation temperatures over the rate of vaporization in the absence of said layer. The solar evaporation process for the production of salt from saline waters such as sea water normally comprises exposing saline water in a series of ponds having increasing salt content up to saturation, whereby the salt crystallizes with additional evaporation of the water. The rate of production is dependent upon the number of ponds available. Consequently, it is desirable to increase the rate of production without attendant increase in the number of ponds. The present invention increases the rate of vaporization such that there is an attendant increase in the rate of production of salt. The practice of the present invention in connection with the solar evaporation process for the production of salt is preferably used in connection with those ponds having salt contents less than saturation, thereby alleviating the problem of separating the water evaporation acceleration additive from the salt crystals obtained in the final evaporating zone or pond.

The term "saline water" as used in the specification and claims defines water having varying salt content, below saturation. For example, it includes brackish waters having a salt content of about 1,000 p.p.m., sea water and other natural waters having higher salt contents.

The following examples are illustrative of the increased rate of evaporation of water from aqueous liquid media that is obtained in practicing the invention.

Example I

A homologous series of commercial para-nonylphenoxypoly(ethyleneoxy) ethanols of the formula:

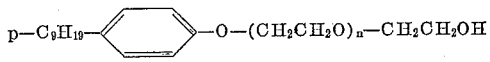

where $n$, the number of ethyleneoxy units varies from about 1 to about 30, were used as the covering agents of water exposed to evaporating conditions at room temperature. These alkanols are available under the trade name Igepal. Since these compounds spread very slowly to form a layer on the surface of the water, 1% solutions of isopropyl alcohol were prepared and the solution added to the surface. The effectiveness of these compounds having varying ethyleneoxy units was ascertained in the following manner. Approximately 50 ml. of tap water was introduced into crystallizing dishes (3 inch diameter) and then 0.2 ml. of the 1% solution of the respective polyethyleneoxy etherphenols was placed on the surface of the water. Appropriate controls containing approximately 50 ml. of water and 0.2 ml. of isopropanol on the surface were weighed and then placed in a humidity cabinet equipped with a small exhust fan for circulating air through the cabinet. The humidity inside of the cabinet was maintained at 35 to 40% by use of indicating Drierite, placed in trays along the walls of the cabinet. The amount of water evaporated was ascertained by periodic weighings of the test dishes, and the grams of water lost was noted. The average loss for the blank (uncovered) and the test (covered) samples, as well as the percent increase of evaporation due to covering a surface of the tap water undergoing evaporation, is shown in Table I. In this example and Example II, $\Delta T-B$ represents a number of grams of additional water evaporated by practicing this invention; and $n$ represents the number of ethyleneoxy units in the aforementioned formula.

TABLE I

| Igepal | n | Hours Exposure | Water Loss in Grams | | | Percent Increased Evaporation |
|---|---|---|---|---|---|---|
| | | | Blank | Test | $\Delta T-B$ | |
| CO-210 | 1.5 | 21 | 6.51 | 7.87 | 1.36 | 20.8 |
| CO-210 | 1.5 | 93 | 22.82 | 26.86 | 4.04 | 17.7 |
| CO-210 | 1.5 | 124 | 9.97 | 12.18 | 2.21 | 22.2 |
| CO-730 | 15 | 21 | 6.55 | 8.08 | 1.53 | 23.4 |
| CO-730 | 15 | 93 | 20.61 | 25.11 | 4.50 | 21.8 |
| CO-730 | 15 | 124 | 8.72 | 10.59 | 1.87 | 21.4 |
| CO-880 | 30 | 21 | 7.14 | 9.08 | 1.94 | 27.2 |
| CO-880 | 30 | 93 | 19.04 | 22.70 | 3.66 | 19.2 |
| CO-880 | 30 | 124 | 8.07 | 9.60 | 1.53 | 18.9 |

Example II

The procedure of Example I was repeated, except that synthetic sea water, prepared in accordance with ASTM Test Method D-665 of the American Society for Testing Materials, was used in place of the tap water as the aqueous liquid medium. The effect of covering the evaporating surface of a saline aqueous medium in accordance with this invention is shown in Table II.

TABLE II

| Igepal | n | Hours Exposure | Water Loss in Grams | | | Percent Increased Evaporation |
|---|---|---|---|---|---|---|
| | | | Blank | Test | ΔT−B | |
| CO-210 | 1.5 | 16 | 3.94 | 4.64 | 0.70 | 17.7 |
| CO-210 | 1.5 | 23 | 1.91 | 2.28 | 0.37 | 19.4 |
| CO-210 | 1.5 | 44 | 4.47 | 5.24 | 0.77 | 17.2 |
| CO-210 | 1.5 | 113 | 14.63 | 16.80 | 2.17 | 14.8 |
| CO-730 | 15 | 16 | 3.92 | 4.69 | 0.77 | 19.6 |
| CO-730 | 15 | 23 | 1.94 | 2.30 | 0.36 | 18.5 |
| CO-730 | 15 | 44 | 4.73 | 5.76 | 1.03 | 21.7 |
| CO-730 | 15 | 113 | 14.06 | 17.22 | 3.16 | 22.5 |
| CO-880 | 30 | 16 | 3.92 | 4.77 | 0.85 | 21.7 |
| CO-880 | 30 | 23 | 1.87 | 2.32 | 0.45 | 24.1 |
| CO-880 | 30 | 44 | 4.69 | 5.76 | 1.07 | 22.8 |
| CO-880 | 30 | 113 | 12.97 | 15.85 | 2.88 | 22.2 |

*Example III*

Aeration of evaporating aqueous liquid media by bubbling aeriform fluids therethrough is known to assist the rate of water evaporation. In this example, beakers of synthetic sea water were aerated by passing air (2.5 s.c.f./hour at 10 p.s.i.g. for 8 hours) through a dispenser placed in the bottom of the beaker, and the volume of water loss noted. A sample of synthetic sea water having its surface covered with 25 ml. of isopropanol alcohol containing 0.5 g. of Igepal CO-210 (water insoluble) lost 66.4 ml. after 8 hours aeration at room temperature, whereas a sample of the synthetic sea water having its surface covered with 25 ml. isopropyl alcohol lost only 27.5 ml. after 8 hours aeration. A sample of synthetic sea water similarly covered with Igepal CO-880 (water soluble) foamed excessively; and its water loss was equivalnet to the uncovered aerated sample. When 0.5 g. of Igepal CO-210 was spread in bulk upon the surface of another beaker of synthetic sea water and similarly aerated, there was a 31.4 ml. water loss; whereas the uncovered control lost 11.8 ml. of water under the same conditions. Thus a very unexpected result, namely, about a three-fold increase in the rate of water evaporation, was obtained by covering the surface of aerated saline water with a water-insoluble type nonylphenoxypoly(ethyleneoxy) ethanol either from bulk or from solution over the rate of evaporation obtained by merely aerating the water. The water-insoluble nonylphenoxypoly(ethyleneoxy) ethanols effective as water evaporation acceleration agents in combination with aeration contain from about 1 to about 4 ethyleneoxy groups.

The above data show that by covering the surface of an aqueous liquid medium such as saline water with a film of alkylphenoxypoly(alkyleneoxy) alkanol there is a substantial increase in the rate of evaporation of the water from aqueous medium. Thus, the increased rate of evaporation obtained by practicing the present invention is of commercial significance, for it is possible to evaporate more water per unit time at a given temperature than is possible in the absence of much coverage.

In addition to the method of increasing water evaporation provided by the present invention, there is provided a composition for application to the surface of aqueous liquid media to increase water evaporation. This new composition consists essentially of an alkylphenoxypoly (alkyleneoxy) alkanol and a water-miscible lower aliphatic alcohol having from 1 to 4 carbon atoms to facilitate the distribution of said alkanol on the surface of said aqueous liquid media and together with said alkanol to accelerate the rate of evaporation of water from said aqueous liquid media. Preferably the alkylphenoxypoly(alkyleneoxy) alkanol has the formula

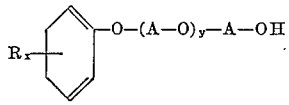

wherein R is an alkyl group having from about 8 to about 18 carbon atoms, $x$ is 1 to 3, A is a divalent aliphatic hydrocarbon radical having the empirical formula $C_nH_{2n}$ wherein $n$ is 2 to 8, and $y$ is 1 to 150; and more preferably is nonylphenoxypoly(ethyleneoxy)$_n$ ethanol wherein $n$ is from about 1 to about 30. The proportions of alkylphenoxypoly(alkyleneoxy) alkanol to the lower aliphatic water-miscible alcohol is not critical, so long as there is complete solution of the alkylphenoxypoly(alkyleneoxy) alkanol in the $C_{1-4}$ alcohol. For economic reasons, the lower limit is about 0.01% of alkylphenoxypoly(alkyleneoxy) alkanol. For effective and quick coverage of water surface, it is preferred that the additive composition contain from about 1 to about 25% of the alkylphenoxypoly (alkyleneoxy) alkanol.

Thus having described the invention, what is claimed is:

1. The method comprising covering the surface of an aqueous liquid medium undergoing evaporation with a film of an alkylphenoxypoly(alkyleneoxy) alkanol, whereby the rate of evaporation of water from said medium is accelerated at a given temperature over the rate of evaporation in the absence of said film.

2. The method of claim 1 wherein said alkanol has the formula

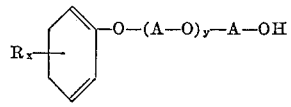

wherein R is an alkyl group having from about 8 to about 18 carbon atoms, $x$ is 1 to 3, A is a divalent alkylene group having the empirical formula $C_nH_{2n}$ wherein $n$ is 2 to 8, and $y$ is 1 to 150.

3. The method of claim 1 wherein said alkanol is nonylphenoxypoly(ethyleneoxy)$_n$ ethanol, wherein $n$ is from about 1 to about 30.

4. The method of claim 1 wherein said aqueous liquid medium is saline water.

5. The method of claim 1 wherein said evaporation is conducted at temperatures below the boiling point of said aqueous liquid medium.

6. The method comprising bubbling an aeriform fluid through a body of an aqueous liquid medium having positioned on its surface a film of nonylphenoxypoly(ethyleneoxy)$_n$ ethanol wherein $n$ is from 1 to about 4, at a temperature below the boiling point of said liquid medium, whereby the rate of evaporation of water from said medium is accelerated at evaporation temperatures over the rate of evaporation in the absence of said film.

7. In the operation of a solar still for the production of fresh water from saline water the improvement of maintaining on the surface of the saline water undergoing evaporation in said still a floating film of an alkylphenoxypoly(alkyleneoxy) alkanol, whereby the rate of evaporation of water is accelerated at a given temperature over the rate of evaporation in the absence of said film.

8. The method of claim 7 wherein said ankanol has the formula

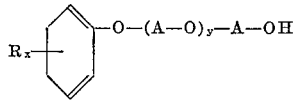

wherein R is an alkyl group having from about 8 to about 18 carbon atoms, $x$ is 1 to 3, A is a divalent alkylene group having the empirical formula $C_nH_{2n}$ whenein $n$ is 2 to 8, and $y$ is 1 to 150.

9. The method of claim 7 wherein said alkanol is nonylphenoxypoly(ethyleneoxy)$_n$ ethanol, wherein $n$ is from about 1 to about 30.

10. A method for the production of fresh water from saline water which comprises forming water vapor by exposing a body of saline water having positioned on its surface a floating film of an alkylphenoxypoly(alkyleneoxy) alkanol to heat in an evaporating zone; collecting and condensing said water vapor to obtain fresh water; and thereafter covering the surface of said condensed fresh water with a film of an ester of a long straight chain fatty alcohol having the formula:

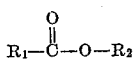

wherein $R_1$ is selected from the group consisting of hydrogen and an alkyl group having 1 to 2 carbon atoms, and $R_2$ is an alkyl group having from about 10 to about 36 carbon atoms, whereby evaporation of said condensed fresh water is retarded.

11. The method of claim 10 wherein said ester is an acetic acid ester of a long chain fatty alcohol having from about 10 to about 18 carbon atoms.

12. The method of claim 10 wherein said ester is cetyl acetate.

13. A method for the production of fresh water from saline water which comprises: introducing saline water to an evaporating-condensing zone wherein water is vaporized, condensed and collected as fresh water; maintaining on the surface of the saline water undergoing evaporation in said zone a floating film of an alkylphenoxypoly(alkyleneoxy) alkanol; covering the surface of the collected condensed fresh water in said zone with a film of an ester of a long straight chain fatty alcohol having the formula:

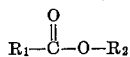

wherein $R_1$ is selected from the group consisting of hydrogen and an alkyl group having 1 to 2 carbon atoms, and $R_2$ is an alkyl group having from about 10 to about 36 carbon atoms, whereby evaporation of said collected fresh water is retarded; and continuously removing said fresh water from said zone.

14. The method of claim 13 wherein said alkanol has the formula

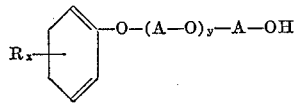

wherein R is an alkyl group having from about 8 to about 18 carbon atoms, $x$ is 1 to 3, A is a divalent alkylene group having the empirical formula $C_nH_{2n}$ wherein $n$ is 2 to 8, and $y$ is 1 to 150.

15. The method of claim 13 wherein said alkanol is nonylphenoxypoly(ethyleneoxy)$_n$ ethanol wherein $n$ is from about 1 to about 30.

16. The method of claim 13 wherein said ester is an acetic acid ester of a long chain fatty alcohol having from about 10 to about 18 carbon atoms.

17. The method of claim 13 wherein said ester is cetyl acetate.

18. In the method of manufacturing salt by solar evaporation of saline water in an evaporating zone the improvement which comprises covering the surface of said saline water in said zone with a floating film of an alkylphenoxypoly(alkyleneoxy) alkanol, whereby the rate of evaporation of water is accelerated at evaporation temperatures over the rate of evaporation in the absence of said film.

19. The method of claim 18 wherein said alkanol has the formula

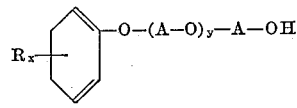

wherein R is an alkyl group having from about 8 to about 18 carbon atoms, $x$ is 1 to 3, A is a divalent alkylene group having the empirical formula $C_nH_{2n}$ wherein $n$ is 2 to 8, and $y$ is 1 to 150.

20. The method of claim 18 wherein said alkanol is nonylphenoxypoly(ethyleneoxy)$_n$ ethanol wherein $n$ is from about 1 to about 30.

References Cited by the Examiner

UNITED STATES PATENTS

| | | | |
|---|---|---|---|
| 2,593,112 | 4/1952 | Cross et al. | 252—89 |
| 2,903,486 | 9/1959 | Brown et al. | 252—89 |
| 2,941,589 | 6/1960 | Johnson | 159—47 |

OTHER REFERENCES

Sebba et al., "Journal of the Chemical Society," January–June 1940, pages 106–118.

Timblin et al., "Journal American Water Works Association," vol. 49, No. 7, July 1957, pages 841–843.

NORMAN YUDKOFF, *Primary Examiner.*